(12) United States Patent
Schlienger et al.

(10) Patent No.: US 8,298,472 B2
(45) Date of Patent: Oct. 30, 2012

(54) SYSTEM, APPARATUS, AND METHOD FOR RESIN LEVEL MAINTENANCE IN A STEREO-LITHOGRAPHY DEVICE

(75) Inventors: Max Eric Schlienger, Napa, CA (US); Paul Anthony Withey, Derby (GB)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 12/853,007

(22) Filed: Aug. 9, 2010

(65) Prior Publication Data

US 2011/0049767 A1    Mar. 3, 2011

Related U.S. Application Data

(60) Provisional application No. 61/232,449, filed on Aug. 9, 2009.

(51) Int. Cl.
*B29C 35/08* (2006.01)

(52) U.S. Cl. .............. 264/497; 425/174.4; 425/375; 425/449; 264/308; 264/401

(58) Field of Classification Search .............. 425/174.4, 425/375, 449; 264/308, 401, 497
See application file for complete search history.

(56) References Cited

U.S. PATENT DOCUMENTS

| | | | |
|---|---|---|---|
| 5,038,014 A | 8/1991 | Pratt et al. | |
| 5,120,476 A | 6/1992 | Scholz | |
| 5,121,329 A | 6/1992 | Crump | |
| 5,174,931 A * | 12/1992 | Almquist et al. | 264/401 |
| 5,287,435 A | 2/1994 | Cohen et al. | |
| 5,402,351 A | 3/1995 | Batchelder et al. | |
| 5,573,721 A * | 11/1996 | Gillette | 264/401 |
| 5,609,814 A | 3/1997 | Takano | |
| 5,633,021 A | 5/1997 | Brown et al. | |
| 5,651,934 A | 7/1997 | Almquist et al. | |
| 5,656,230 A | 8/1997 | Khoshevis | |
| 5,820,811 A | 10/1998 | Murakami et al. | |
| 5,922,364 A | 7/1999 | Young, Jr. | |
| 6,401,001 B1 | 6/2002 | Jang et al. | |
| 6,405,095 B1 | 6/2002 | Jang et al. | |
| 6,607,689 B1 | 8/2003 | Farnworth | |
| 6,733,267 B2 | 5/2004 | Chapman et al. | |
| 6,841,116 B2 | 1/2005 | Schmidt | |
| 2005/0104257 A1 | 5/2005 | Gu et al. | |

\* cited by examiner

*Primary Examiner* — Joseph Del Sole
*Assistant Examiner* — David N Brown, II
(74) *Attorney, Agent, or Firm* — Krieg DeVault LLP

(57) ABSTRACT

A system includes a stereo-lithography device having a primary fluid vessel having an amount of a photo-curable fluid therein. The system includes a leveling reservoir fluidly coupled to the primary fluid vessel, where a fluid level in the leveling reservoir is vertically positionable. The system further includes a controller that maintains a pre-determined level of the photo-curable fluid in the primary fluid vessel by vertically positioning the fluid level in the leveling reservoir.

26 Claims, 2 Drawing Sheets

SYSTEM, APPARATUS, AND METHOD FOR RESIN LEVEL MAINTENANCE IN A STEREO-LITHOGRAPHY DEVICE

CROSS REFERENCE TO RELATED APPLICATIONS

The present application claims the benefit of U.S. Provisional Patent Application No. 61/232,449, filed Aug. 9, 2009, and is incorporated herein by reference.

BACKGROUND

Stereo-lithography devices utilize a viscous fluid that is responsive to light to form a solid material. The viscous fluid is typically a resin, and may be a filled resin, that can cause significant wear on a pump. During manufacturing operations, it is desirable that a resin fluid level is properly maintained so that precision parts can be properly prepared from the stereo-lithography operations. Therefore, further technological developments are desirable in this area.

SUMMARY

One embodiment is a unique method for maintaining a resin level in a manufacturing process. Further embodiments, forms, objects, features, advantages, aspects, and benefits shall become apparent from the following description and drawings.

DESCRIPTION OF THE ILLUSTRATIVE EMBODIMENTS

Figure 1:
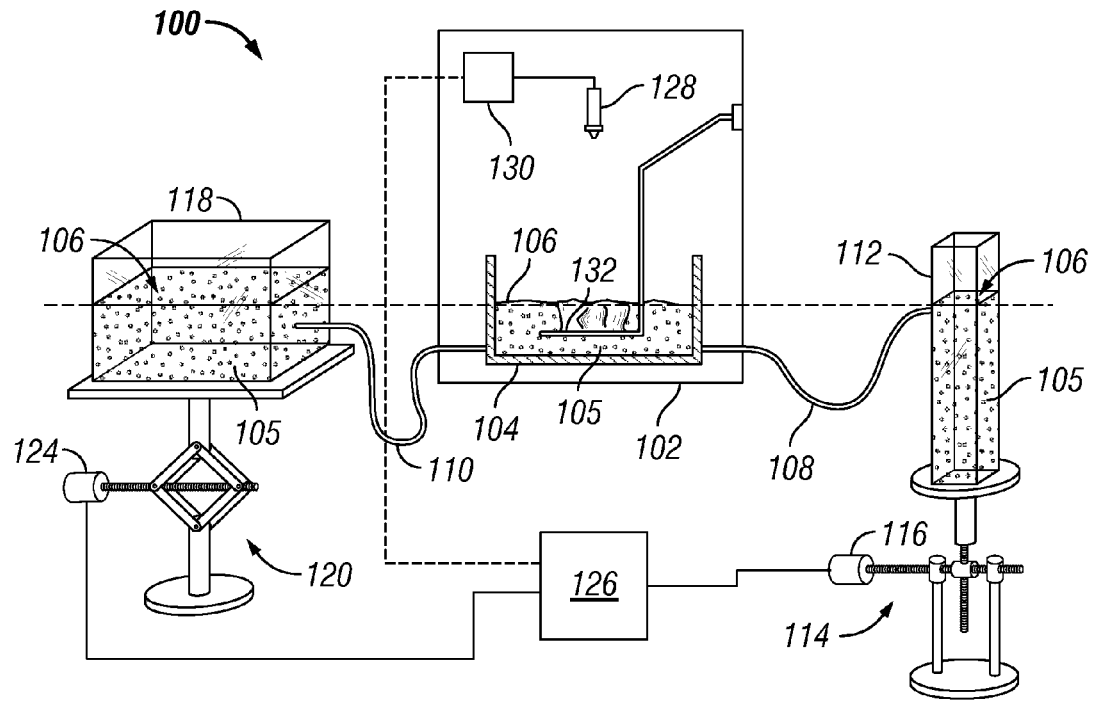
FIG. 1 is a schematic illustration of a system for leveling a fluid reservoir in a stereo-lithography device.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic diagram of a system 100, including a stereo-lithography device 102 having a primary fluid vessel 104 having an amount of a photo-curable fluid 105 therein. The stereo-lithography device 102 may be any type of device understood in the art, and may include a manufacturing controller 130 that reads an electronic instruction file, an optical device 128 (e.g. a laser, projector, lens, prism, and/or mirror), and a support 107 for a manufactured component 132. The support 107 may be configured to hold the manufactured component 132 stationary, or may be configured to move the manufactured component 132 during manufacturing operations. For example, the support 107 may lower the manufactured component 132 as subsequent layers of the component 132 are added.

The photo-curable fluid 105 has a surface 106 where the optical device 128 projects light, curing the fluid and forming the component 132 at the position where the light strikes the surface 106. The surface 106 is specifically positioned relative to the optical device 128, for example at the focal length of the optical device 128, and the focal length of the optical device 128 may be configurable during a manufacturing operation. Additionally, the surface 106 may tend to vary during manufacturing operations, for example as the fluid 105 is consumed during the manufacturing process, or as the component 132 is raised from or lowered into the fluid 105 (e.g. between manufacturing subsequent layers of the component).

The system 100 further includes a leveling reservoir 112 fluidly coupled to the primary fluid vessel 104 (e.g. through a flexible fluid conduit 108), where a fluid level of the fluid in the leveling reservoir 112 is vertically positionable. The schematic illustration of FIG. 1 shows a vertical positioning device 114 coupled to an electronic motor 116 controllable by a controller 126. The vertical positioning device 114 in FIG. 1 controls the fluid level 106 in the leveling reservoir 112 by vertically moving the leveling reservoir 112. When the leveling reservoir 112 is raised, fluid flows from the leveling reservoir 112 into the primary fluid vessel 104, raising the fluid level 106 slightly in both vessels 104, 112. When the leveling reservoir 112 is lowered, fluid flows from the primary fluid vessel 104 into the leveling reservoir 112, lowering the fluid level 106 slightly in both vessels. Thereby, the controller 126 can re-establish the fluid level 106 at the pre-determined level, during manufacturing operations and/or between manufacturing stages while manufacturing the component 132.

The controller 126 is structured to perform certain operations to maintain the fluid level 106. In certain embodiments, the controller 126 forms a portion of a processing subsystem including one or more computing devices having memory, processing, and communication hardware. The controller 126 may be a single device or a distributed device, and the functions of the controller may be performed by hardware or software. In certain embodiments, at least some operations of the controller 126 may be performed manually by an operator (not shown).

The exemplary device illustrates the logical connections, but any type of device providing a controller 126 (including a manual operator) that has an actuator 116 to control a vertical position of the leveling reservoir 112 is contemplated herein. One of skill in the art will recognize that a small leveling reservoir 112 surface area relative to the primary fluid vessel 104 surface area will allow more precise control of the primary fluid vessel 104 surface area (i.e. larger changes in the leveling reservoir 112 create smaller changes in the fluid level 106) while a larger leveling reservoir 112 surface area relative to the primary fluid vessel 104 surface area allows the leveling reservoir 112 to replace a greater amount of fluid 105 during the leveling operations. The leveling reservoir 112 is illustrated with a constant cross-sectional area as a function of vertical position along the leveling reservoir 112, but the cross-sectional area can vary.

One of skill in the art can determine the need for precision versus fluid volume, also accounting for the total available vertical movement of the leveling reservoir 112 due to any limitations such as the physical space available, the type and capability of the actuator 116 or vertical positioning device 114, etc. The presented leveling reservoir 112 configuration with the primary fluid vessel 104 allows the system 100 to maintain the proper fluid level 106 during manufacturing operations without exposing any moving parts to the fluid 105. In certain embodiments, the controller 126 maintains a pre-determined level of the photo-curable fluid 105 in the primary fluid vessel 104 by vertically moving the leveling reservoir 112.

The system 100 further includes a replenishment reservoir 118 selectively fluidly coupled with the primary fluid vessel 104, for example through a fluid conduit 110. In certain embodiments, a valve (not shown) operable by the controller 126 is interposed between the replenishment reservoir 118 and the primary fluid vessel 104, although in other embodiments, the replenishment reservoir 118 is fluidly coupled to the primary fluid vessel 104 at all times. The fluid coupling between the replenishment reservoir 118 and the primary fluid vessel 104 may also occur through the leveling reservoir 112, or the leveling reservoir 112 may be fluidly coupled with the primary fluid vessel 104 through the replenishment reservoir 118. One of skill in the art will recognize that, if the replacement reservoir 118 is fluidly coupled to the primary fluid vessel 104 during the leveling operations of the leveling reservoir 112, the surface area of the replenishment reservoir 118 will affect the precision and volume capacity of the leveling reservoir 112. The replenishment reservoir 118 may be fluidly coupled with the primary fluid vessel 104 during leveling operations or not. In certain embodiments, the replenishment reservoir 118 is fluidly coupled to the primary fluid vessel 104 before and after manufacturing operations of the stereo-lithography device 102, and is de-coupled to the primary fluid vessel 104 during manufacturing operations of the stereo-lithography device 102.

In certain embodiments, the pre-determined level of the photo-curable fluid 105 in the primary fluid vessel 104 corresponds to a focal plane of the optical device 128 of the stereo-lithography device 102. The controller 126 may be further structured to transfer fluid between the replenishment reservoir 118 and primary fluid vessel 104 in response to the stereo-lithography device 102 completing a layer of a component 132 being manufactured by the device 102, in response to the stereo-lithography device 102 completing a specified number of layers of the component 132, and/or in response to the manufacturing process of the component consuming a specified amount of the photo-curable fluid 105.

In an exemplary embodiment, the leveling reservoir 112 is moved to a default position prior to an operation of the stereo-lithography device 102 to manufacture a layer of a component 132, and a fluid level of the replenishment fluid in the replenishment reservoir 118 is moved such that the level 106 of the photo-curable fluid 105 in the primary fluid vessel 104 is at the pre-determined level prior to the operation of the stereo-lithography device 102 to manufacture a layer of a component 132. In the illustrated embodiment, the fluid level of the replenishment fluid in the replenishment reservoir 118 is controlled by moving the replenishment reservoir 118 vertically with a vertical positioning device 120 responding to an actuator 124 controlled by the controller 126. In one example, the leveling reservoir 112 is positioned at a default position such as a position centered around the fluid level 106, a position to allow maximum raising of the leveling reservoir 112 during manufacturing operations, or a position allowing maximum lowering of the leveling reservoir 112 during manufacturing operations. The pre-determined level may be changed in response to the stereo-lithography device 102 completing a layer of a component 132 being manufactured by the device 102.

Figure 2:
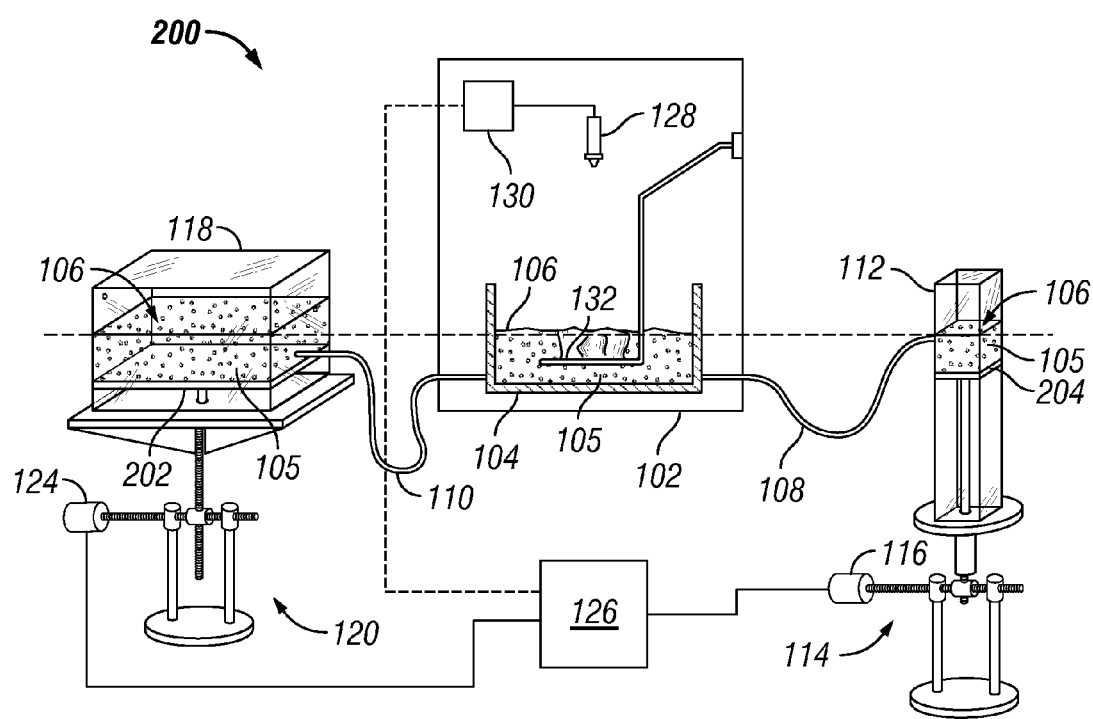
FIG. 2 is a schematic illustration of another system for leveling a fluid reservoir in a stereo-lithography device.

Referencing FIG. 2, an alternate embodiment of a system 200 for leveling a fluid reservoir in a stereo-lithography device is shown. The system 200 includes the actuator 116 that moves a plunger 204 to control the fluid level in the leveling reservoir 112. Additionally or alternatively, the system 200 includes an actuator 124 that moves a plunger 202 to control the fluid level in the replenishment reservoir 118.

Figure 3:
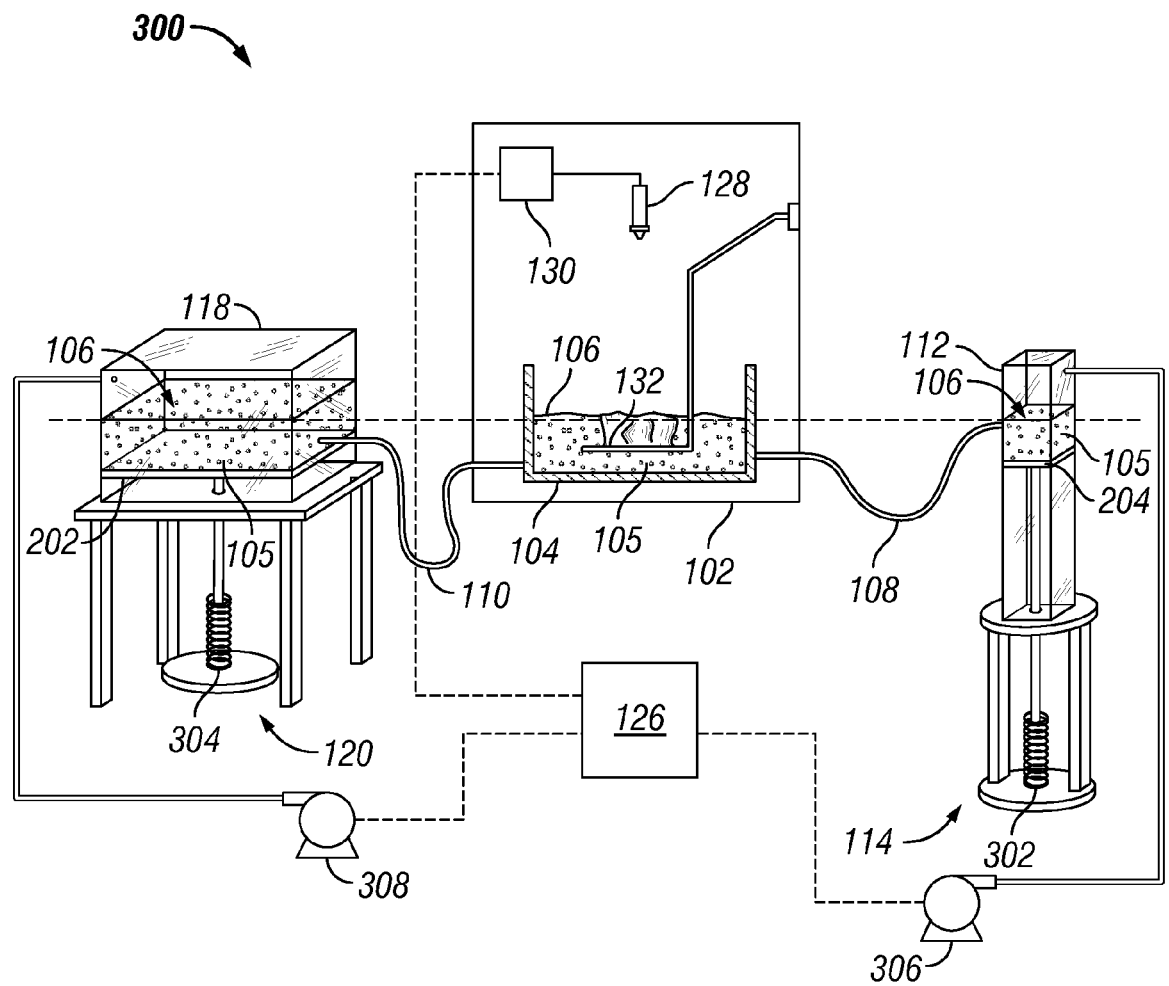
FIG. 3 is a schematic illustration of yet another system for leveling a fluid reservoir in a stereo-lithography device.

Referencing FIG. 3, yet another embodiment of a system 300 for leveling a fluid reservoir in a stereo-lithography device is shown. The system 300 includes a pump 306 that controls an overpressure in the leveling reservoir 112. The overpressure in the leveling reservoir 112, for example an air pressure in the space above the fluid 105, controls the level of the fluid in the leveling reservoir 112. Any pressure-controlled fluid level control is contemplated herein. The specific illustration of FIG. 3 shows a biasing force (e.g. a spring 302) that tends to push the fluid level higher, with the overpressure opposing the spring 302 and controlling the fluid level. Similarly, a pump 308 provides an overpressure in the replenishment reservoir 118, which may act against a spring 304, to control the fluid level in the replenishment reservoir 118.

An exemplary technique for leveling a resin fluid in a stereo-lithography device is described. The technique includes an operation to provide a stereo-lithography device having a primary fluid vessel having an amount of a photo-curable fluid therein, and an operation to provide a leveling reservoir fluidly coupled to the primary fluid vessel. A fluid level in the leveling reservoir is vertically positionable. The technique includes an operation to provide a replenishment reservoir fluidly coupled to the primary fluid vessel, where a fluid level in the replenishment reservoir is also vertically positionable. The technique includes an operation to position the replenishment fluid level in the replenishment reservoir such that a photo-curable fluid level in the primary fluid vessel is at a pre-determined level. The technique further includes an operation to manufacture a layer of a component in the primary fluid vessel and an operation to maintain the pre-determined level of the photo-curable fluid in the primary fluid vessel during the manufacturing by vertically positioning the fluid level in the leveling reservoir.

In certain embodiments, the technique further includes an operation to add a photo-curable fluid to the primary fluid vessel, and an operation to move the fluid level in the replenishment reservoir and/or the fluid level in the leveling reservoir to return a level of the photo-curable fluid level to the pre-determined level. An exemplary embodiment includes vertically positioning the fluid level in the leveling reservoir by vertically moving the leveling reservoir. Another exemplary embodiment includes vertically positioning the fluid level in the leveling reservoir by moving a piston that causes the fluid level in the leveling reservoir to move. Another exemplary embodiment includes vertically positioning the fluid level in the leveling reservoir by controlling an overpressure in the leveling reservoir, where the amount of the overpressure positions the fluid level in the leveling reservoir. Any operation described to vertically position the fluid level in the leveling reservoir may also be used to vertically position the fluid level in the replenishment reservoir.

An exemplary technique further includes an operation to vertically position the fluid level in the leveling reservoir by vertically moving the leveling reservoir, and further includes an operation to position the leveling reservoir at a default position before the operation to position the replenishment fluid level in the replenishment reservoir such that the photo-curable fluid level in the primary fluid vessel is at a pre-determined level. Thereby, the technique provides the leveling reservoir with a pre-determined amount of leveling fluid available in the leveling reservoir before the operation to manufacture the layer of the component. The exemplary technique further includes an operation to repeat the operation to position the leveling reservoir to the default position, and to repeat the operation to position the replenishment reservoir such that a photo-curable fluid level in the primary fluid vessel is at the pre-determined level in response to completing the manufacturing of the layer of the component in the primary fluid vessel. An exemplary technique further includes an operation to change the pre-determined level in response to completing the operation to manufacture the layer of a component in the primary fluid vessel. An exemplary pre-determined level is a focal plane of an optical device of the stereo-lithography device.

As is evident from the figures and text presented above, a variety of embodiments according to the present invention are contemplated.

One exemplary embodiment is a system, including a stereo-lithography device having a primary fluid vessel having an amount of a photo-curable fluid therein, a leveling reservoir fluidly coupled to the primary fluid vessel, a fluid level in the leveling reservoir being vertically positionable, and a controller structured to maintain a pre-determined level of the photo-curable fluid in the primary fluid vessel by vertically positioning the fluid level in the leveling reservoir. The system further includes a replenishment reservoir selectively fluidly coupled with the primary fluid vessel, wherein the controller is further structured to transfer fluid between the replenishment reservoir and the primary fluid vessel.

In certain embodiments, the pre-determined level of the photo-curable fluid in the primary fluid vessel corresponds to a focal plane of an optical device of the stereo-lithography device. The controller may be further structured to transfer fluid between the replenishment reservoir and primary fluid vessel in response to the stereo-lithography device completing a layer of a component being manufactured by the device. In an exemplary embodiment, the fluid level in the leveling reservoir is positioned by moving the leveling reservoir vertically, and the leveling reservoir is moved to a default position prior to an operation of the stereo-lithography device to manufacture a layer of a component. The fluid level in the replenishment reservoir is moved such that the level of the photo-curable fluid in the primary fluid vessel is at the pre-determined level prior to the operation of the stereo-lithography device to manufacture a layer of a component. The pre-determined level may be changed in response to the stereo-lithography device completing a layer of a component being manufactured by the device. The default position includes a position determined in response to the pre-determined level.

Another exemplary embodiment is a method including providing a stereo-lithography device having a primary fluid vessel having an amount of a photo-curable fluid therein, providing a leveling reservoir fluidly coupled to the primary fluid vessel, the leveling reservoir having a fluid level that is vertically positionable, and providing a replenishment reservoir fluidly coupled to the primary fluid vessel. The replenishment reservoir has a fluid level that is vertically positionable. In certain embodiments, the fluid level in the leveling reservoir is vertically positioned by the vertical movement of the leveling reservoir, and the method further includes positioning the leveling reservoir to a default position, and then positioning the fluid level in the replenishment reservoir such that a photo-curable fluid level in the primary fluid vessel is at a pre-determined level before manufacturing a layer of the component in the primary fluid vessel. In certain embodiments, the method includes repeating the positioning the leveling reservoir to a default position and positioning the replenishment reservoir such that a photo-curable fluid level in the primary fluid vessel is at a pre-determined level in response to completing the manufacturing a layer of a component in the primary fluid vessel.

The method further includes maintaining the pre-determined level of the photo-curable fluid in the primary fluid vessel during the manufacturing by moving the fluid level in the leveling reservoir. The method further includes adding a photo-curable fluid to the primary fluid vessel, and moving the fluid level in the replenishment reservoir and/or the fluid level in the leveling reservoir to return a level of the photo-curable fluid level to the pre-determined level. The exemplary method includes changing the pre-determined level in response to completing the manufacturing a layer of a component in the primary fluid vessel, where the pre-determined level includes a focal plane of an optical device of the stereo-lithography device.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   a stereo-lithography device having a primary fluid vessel having an amount of a photo-curable fluid therein;
   a leveling reservoir fluidly coupled to the primary fluid vessel, wherein a fluid level in the leveling reservoir is vertically positionable; and
   a controller structured to maintain a pre-determined level of the photo-curable fluid in the primary fluid vessel by vertically positioning the fluid level in the leveling reservoirs;
   a replenishment reservoir selectively fluidly coupled with the primary fluid vessel, wherein the controller is further structured to transfer fluid between the replenishment reservoir and the primary fluid vessel; and
   wherein the leveling reservoir is vertically moveable, and wherein the leveling reservoir is moved to a default position prior to an operation of the stereo-lithography device to manufacture a layer of a component, and wherein the replenishment reservoir is moved such that a level of the photo-curable fluid in the primary fluid vessel is at the pre-determined level prior to the operation of the stereo-lithography device to manufacture the layer of the component.

2. The system of claim 1, wherein the pre-determined level of the photo-curable fluid in the primary fluid vessel corresponds to a focal plane of an optical device of the stereo-lithography device.

3. The system of claim 1, wherein the controller is further structured to transfer fluid between the replenishment reservoir and the primary fluid vessel in response to the stereo-lithography device completing a layer of a component being manufactured by the device.

4. The system of claim 1, wherein the pre-determined level is changed in response to the stereo-lithography device completing a layer of a component being manufactured by the device.

5. The system of claim 1, wherein the pre-determined level is changed in response to the stereo-lithography device completing a layer of a component being manufactured by the device.

6. A system, comprising:
a stereo-lithography device having a primary fluid vessel having an amount of a photo-curable fluid therein;
a leveling reservoir fluidly coupled to the primary fluid vessel, wherein a fluid level in the leveling reservoir is vertically positionable; and
a controller structured to maintain a pre-determined level of the photo-curable fluid in the primary fluid vessel by vertically positioning the fluid level in the leveling reservoir;
a replenishment reservoir selectively fluidly coupled with the primary fluid vessel, wherein the controller is further structured to transfer fluid between the replenishment reservoir and the primary fluid vessel, wherein the pre-determined level is changed in response to the stereo-lithography device completing a layer of a component being manufactured by the device; and
wherein the leveling reservoir is vertically moveable, and wherein the leveling reservoir is moved to a default position prior to an operation of the stereo-lithography device to manufacture the layer of the component, and a level of replenishment fluid in the replenishment reservoir is vertically positioned such that the level of the photo-curable fluid in the primary fluid vessel is at the pre-determined level prior to the operation of the stereo-lithography device to manufacture the layer of the component.

7. The system of claim 6, wherein the default position comprises a position determined in response to the pre-determined level.

8. The system of claim 1, further comprising a controllable piston that positions the fluid level in the leveling reservoir.

9. A system, comprising:
a stereo-lithography device having a primary fluid vessel having an amount of a photo-curable fluid therein;
a leveling reservoir fluidly coupled to the primary fluid vessel, wherein a fluid level in the leveling reservoir is vertically positionable;
a controller structured to maintain a pre-determined level of the photo-curable fluid in the primary fluid vessel by vertically positioning the fluid level in the leveling reservoir; and
further comprising a pressurizing pump that controls an overpressure on the leveling reservoir, wherein the amount of the overpressure positions the fluid level in the leveling reservoir.

10. A system, comprising:
a stereo-lithography device having a primary fluid vessel having an amount of a photo-curable fluid therein;
a leveling reservoir fluidly coupled to the primary fluid vessel, wherein a fluid level in the leveling reservoir is vertically positionable and wherein the leveling reservoir is vertically moveable; and
a controller structured to maintain a pre-determined level of the photo-curable fluid in the primary fluid vessel by vertically positioning the fluid level in the leveling reservoir.

11. The system of claim 6, wherein the pre-determined level of the photo-curable fluid in the primary fluid vessel corresponds to a focal plane of an optical device of the stereo-lithography device.

12. The system of claim 6, wherein the controller is further structured to transfer fluid between the replenishment reservoir and the primary fluid vessel in response to the stereo-lithography device completing a layer of a component being manufactured by the device.

13. The system of claim 6, wherein the pre-determined level is changed in response to the stereo-lithography device completing a layer of a component being manufactured by the device.

14. The system of claim 6, further comprising a controllable piston that positions the fluid level in the leveling reservoir.

15. The system of claim 9, wherein the pre-determined level of the photo-curable fluid in the primary fluid vessel corresponds to a focal plane of an optical device of the stereo-lithography device.

16. The system of claim 9, further comprising a replenishment reservoir selectively fluidly coupled with the primary fluid vessel, wherein the controller is further structured to transfer fluid between the replenishment reservoir and the primary fluid vessel.

17. The system of claim 16, wherein the controller is further structured to transfer fluid between the replenishment reservoir and the primary fluid vessel in response to the stereo-lithography device completing a layer of a component being manufactured by the device.

18. The system of claim 16, wherein the pre-determined level is changed in response to the stereo-lithography device completing a layer of a component being manufactured by the device.

19. The system of claim 9, wherein the pre-determined level is changed in response to the stereo-lithography device completing a layer of a component being manufactured by the device.

20. The system of claim 9, further comprising a controllable piston that positions the fluid level in the leveling reservoir.

21. The system of claim 10, wherein the pre-determined level of the photo-curable fluid in the primary fluid vessel corresponds to a focal plane of an optical device of the stereo-lithography device.

22. The system of claim 10, further comprising a replenishment reservoir selectively fluidly coupled with the primary fluid vessel, wherein the controller is further structured to transfer fluid between the replenishment reservoir and the primary fluid vessel.

23. The system of claim 22, wherein the controller is further structured to transfer fluid between the replenishment reservoir and the primary fluid vessel in response to the stereo-lithography device completing a layer of a component being manufactured by the device.

24. The system of claim 22, wherein the pre-determined level is changed in response to the stereo-lithography device completing a layer of a component being manufactured by the device.

25. The system of claim 10, wherein the pre-determined level is changed in response to the stereo-lithography device completing a layer of a component being manufactured by the device.

26. The system of claim 10, further comprising a controllable piston that positions the fluid level in the leveling reservoir.

* * * * *